(12) United States Patent
Yoshioka

(10) Patent No.: US 6,617,979 B2
(45) Date of Patent: Sep. 9, 2003

(54) EMERGENCY INFORMING TERMINAL, EMERGENCY INFORMING SYSTEM, AND METHOD FOR CONTROLLING EMERGENCY INFORMING TERMINAL

(75) Inventor: Kenji Yoshioka, Kanagawa (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 09/921,628

(22) Filed: Aug. 3, 2001

(65) Prior Publication Data
US 2002/0075166 A1 Jun. 20, 2002

(30) Foreign Application Priority Data

Aug. 4, 2000 (JP) ........................................ 2000-237044
Apr. 3, 2001 (JP) ........................................ 2001-104792

(51) Int. Cl.[7] ............................................... G08G 1/00
(52) U.S. Cl. ................. 340/901; 340/531; 340/825.36; 340/825.49
(58) Field of Search ............................... 340/901, 938, 340/825.36, 825.45, 825.49, 988, 995, 539, 531, 500, 5.1

(56) References Cited

U.S. PATENT DOCUMENTS

| | | | | |
|---|---|---|---|---|
| 5,311,197 A | * | 5/1994 | Sorden et al. | 342/457 |
| RE35,920 E | * | 10/1998 | Sorden et al. | 342/457 |
| 5,914,675 A | * | 6/1999 | Tognazzini | 340/989 |
| 5,933,080 A | * | 8/1999 | Nojima | 340/539 |
| 5,969,598 A | * | 10/1999 | Kimura | 340/436 |
| 6,124,784 A | * | 9/2000 | Wells | 340/438 |

FOREIGN PATENT DOCUMENTS

JP  9-136608  5/1997

\* cited by examiner

Primary Examiner—Toan N Pham
(74) Attorney, Agent, or Firm—RatnerPrestia (57) ABSTRACT

The disclosed emergency informing terminal mounted on a vehicle for making an emergency call to the center for supervising the emergency informing system recognizes emergency informing signals of different signal formats, and executes the emergency informing process. This emergency informing terminal recognizes emergency informing signals entered in different signal formats in every vehicle, and the control unit for executing emergency informing process according to the signal recognizes whether the signal format belongs to the air bag equipment connected to a vehicular LAN or the directly connected air bag equipment on the basis of the status signal. Consequently, transferring to the input state confirming state of the signal format, the signal is processed. Further, when a signal showing air bag developing state or the like is entered, the emergency informing process is started.

23 Claims, 3 Drawing Sheets

EMERGENCY INFORMING TERMINAL, EMERGENCY INFORMING SYSTEM, AND METHOD FOR CONTROLLING EMERGENCY INFORMING TERMINAL

FIELD OF THE INVENTION

The present invention relates to emergency informing system, emergency call center, emergency informing terminal, and method for controlling emergency informing terminal. In particular, it relates to an emergency informing terminal mounted on a vehicle, and transmitting vehicle position information and other data to the emergency call center in the case of emergency.

BACKGROUND OF THE INVENTION

An emergency informing terminal is mounted on a vehicle, and includes an emergency informing unit for making a telephone call to the center supervising the emergency informing system such as police or an emergency call center through a base station of communications operator or the like.

Hitherto, the emergency informing terminal has been applicable only to specific vehicles for issuing a predetermined air bag developing signal, or vehicles for generating and transmitting the same automatic emergency call signal including an air bag developing signal. The emergency informing terminal is composed of a system for starting automatic emergency informing processing by the signal issued from such vehicles. As an example of such device, a vehicle emergency informing device disclosed in Japanese Laid-open Patent No. 9-136608 is known.

Herein, the emergency informing terminal acquires a signal from the air bag equipment as transmission condition for starting automatic emergency informing process. The emergency informing terminal, when acquiring a signal showing development of air bag, automatically transfers to the emergency informing process.

However, depending on the vehicle or model, if the signal format of the signal issued by the air bag equipment is different, the vehicular terminal needs to be developed and prepared for each vehicle.

SUMMARY OF THE INVENTION

This invention addresses the problems above discussed, and it is an object of the invention to present an emergency informing terminal capable of recognizing plural signal formats so as to be mounted generally on vehicles or models of different signal formats of signals from air bag equipment.

It is also an object of the invention to present an emergency informing terminal capable of identifying which format of signal is entered as an air bag output signal depending on vehicles and models. Accordingly, it comprises signal identifying means for identifying preset signal formats, aside from plural different air bag equipment output signals.

It is another object of the invention to present an emergency informing terminal capable of operating by changing the control unit responsible for the automatic emergency informing process, without changing the control unit for controlling the emergency informing system, if necessary to change the automatic emergency informing process due to a change in the signal format. Accordingly, aside from the control unit for controlling the emergency informing system, it includes a control unit for automatic emergency informing process.

The emergency informing terminal of the invention is mounted on a vehicle, and sends an emergency call to the center for supervising the emergency informing system by emergency informing means.

The emergency informing terminal includes means for recognizing and controlling emergency informing signals entered in different signal formats in every vehicle, and emergency informing means for making emergency informing process on the basis of the recognition and control of the emergency informing signal.

This emergency informing terminal can be mounted generally on vehicles and models different in the signal output format from the air bag equipment.

The emergency informing system of the invention comprises this emergency informing terminal, and an emergency call center for supervising the emergency informing system, and receiving an emergency call signal from the emergency informing terminal.

The control method of the emergency informing terminal of the invention judges whether a LAN mounted vehicle or not by a status signal. According to this method, the air bag equipment is judged to be regular depending on the signal obtained from each vehicle, and judged to be irregular if no signal is entered, and an adequate emergency informing process is done depending on whether the vehicle incorporates the LAN or not.

Thus, not limited to specific vehicles, the invention realizes a versatile emergency informing terminal, emergency informing system, and control method of emergency informing terminal applicable to vehicles generating emergency informing signals in different formats, or air bag developing signals or fuel cut-off signals generated in other signal formats.

DESCRIPTION OF THE PREFERRED EMBODIMENTS

Referring now to the drawings, preferred embodiments of the invention are specifically described below.

(Embodiment 1)

Figure 1:
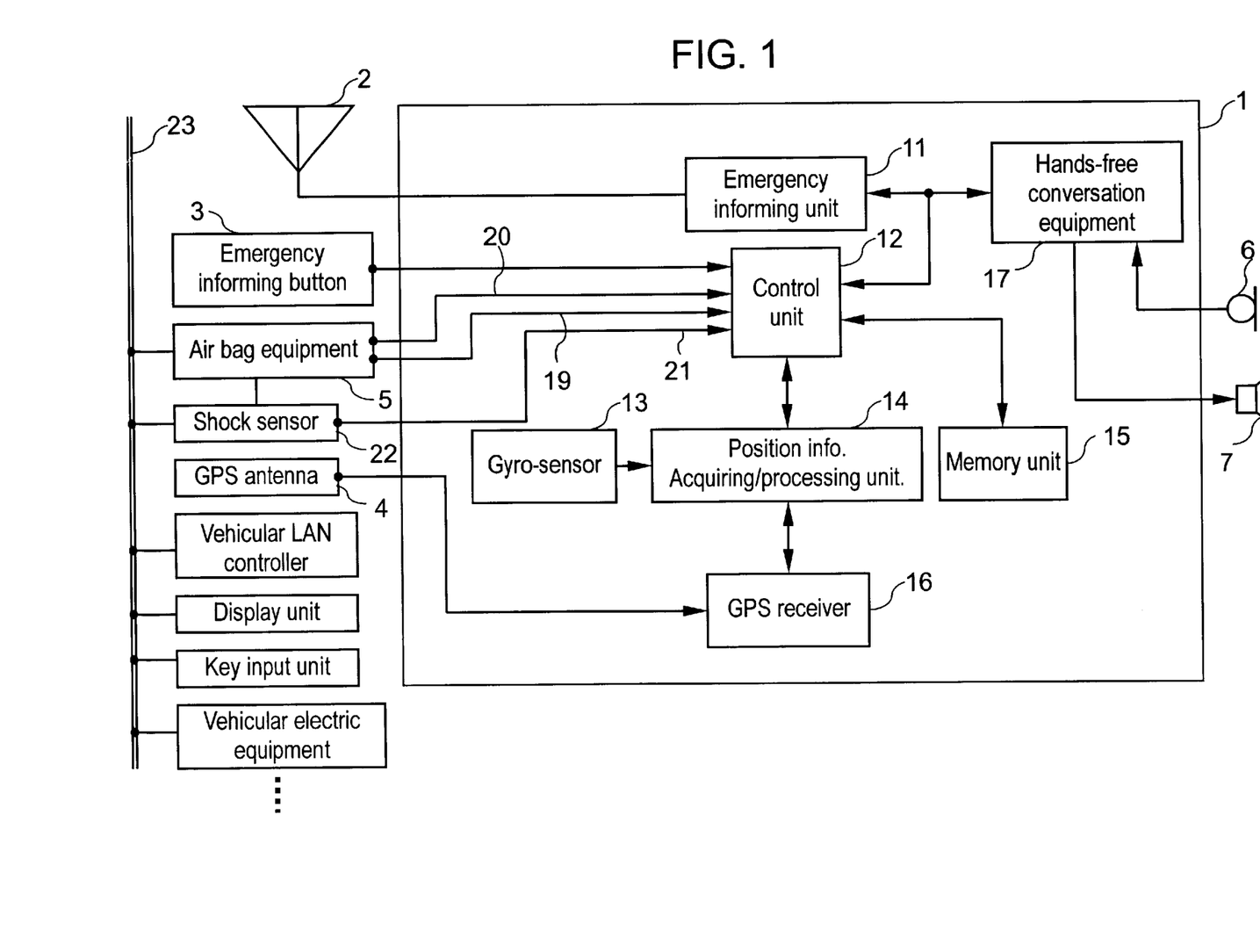
FIG. 1 is a block diagram showing a configuration of an emergency informing terminal in embodiment 1 of the invention.

FIG. 1 is a block diagram showing a configuration of an emergency informing terminal in embodiment 1 of the invention.

In FIG. 1, an emergency informing terminal 1 is mounted on a vehicle, and requests dispatch of an emergency vehicle by transmitting data such as present vehicle position and vehicle registration information to the center supervising the emergency informing system such as the police or emergency call center (hereinafter called the center) in case of emergency such as traffic accident or sickness.

A communication antenna 2 sends a transmission signal from an emergency informing unit 11 to a base station of a communications operator. The antenna 2, receiving a reception signal from the communications operator, transmits to the emergency informing unit 11.

An emergency informing button 3 is pressed by the user (including the driver, the passenger, or third party discovering the accident) in case of emergency such as traffic accident or sickness, and generates a signal for starting transmission process.

A global positioning system (GPS) antenna 4 receives data from a GPS satellite.

A vehicular LAN bus line 23 is connected to each vehicle electric equipment for communication between vehicle electric equipment.

An air bag equipment 5 is connected to a control unit 12 and is actuated by way of a LAN signal line 20 when connected to the vehicular LAN bus line 23, or by way of a direct line 19, which is a signal line other than LAN, in the case of a vehicle without vehicular LAN.

The air bag equipment 5 issues a status signal for identifying whether LAN connection or direct line connection.

The output source of this status signal may be also other device for issuing a vehicle specific signal other than the air bag equipment 5.

This status signal may be a fixed signal (H/L) on the basis of the status if it has been already known that the air bag equipment 5 is controlled by a signal via the LAN or by a signal via the direct line.

At the same time, the air bag equipment 5, when in regular condition, issues a regular condition signal.

When a shock sensor 22 detects a shock larger than a set value in the event of an accident or other emergency, it sends a trigger signal to the air bag equipment 5. At this time, the air bag equipment 5 develops the air bag, and issues a signal necessary for instructing a start of the emergency informing process such as an air bag developing signal.

The shock sensor 22 also generates an emergency fuel cut-off signal at the time of accident. A control unit 12 receives this signal from the fuel cutoff signal line 21, and starts the emergency informing process.

A microphone set 6 is a microphone module incorporating a microphone and an amplifier circuit for feeding the user's voice into the emergency informing terminal 1 when making an emergency call in the emergency informing process.

A speaker 7 converts the reception signal from the center into audio signal and sounds at the time of emergency call. The microphone 6 and speaker 7 are connected to the hands-free conversation equipment 17 incorporated in the emergency informing terminal 1 as described later.

The emergency informing unit 11, when receiving a transmission request signal from the control unit 12, starts an emergency call to the partner of the telephone number entered from the control unit 12 by way of the base station of communications operator or the like. The emergency informing unit 11 transfers to the conversation control or data communication control when receiving a response signal from the partner or a signal transferring to conversation state such as a busy signal.

The emergency informing unit 11 sends a signal telling transfer to conversation state to the control unit 12.

Further, the emergency informing unit 11 transmits the vehicle running direction, position information and other data entered from the control unit 12, to the partner, that is, the center through the base station of communications operator.

The control unit 12 records the position information and other data acquired from a position information acquiring and processing unit 14 in a memory unit 15.

The control unit 12 has the following functions.

1) To recognize an emergency call request, by the operation signal from the emergency informing button 3, an air bag developing signal issued by the air bag equipment 5 at the time of a collision or an accident, or an automatic emergency informing signal on the basis of fuel cut-off signal.
2) To start the emergency informing process by taking out position information and other data recorded in the memory unit 15.
3) To acquire telephone number of the center supervising the emergency informing system such as police and the emergency call center recorded in the memory unit 15.
4) To request telephone call to the emergency informing unit 11 by using this telephone number.
5) To recognize transfer to conversation state when receiving a response signal from the partner corresponding to the telephone number, or a signal for transferring to conversation state such as busy signal.
6) To send position information history data obtained from the position information acquiring and processing unit 14, and the center calling signal to the emergency informing unit 11 through the base station of communications operator.

A gyro sensor 13 generates information such as a vehicle running direction.

The position information acquiring and processing unit 14 sends the data from the gyro sensor 13, position information generated from the data received in the GPS receiver 16 through the GPS antenna 4, and other data to the control unit 12.

The memory unit 15 records the center telephone number, the registration number of the vehicle mounting the emergency informing terminal 1, position information generated in the position information acquiring and processing unit 14, and other data. The memory unit 15 issues the recorded data by the request signal from the control unit 12.

The GPS receiver 16 processes the data obtained from the GPS antenna 4, and sends the position information and other data to the position information acquiring and processing unit 14.

The hands-free conversation equipment 17 processes the transmission voice signal from the user, and the reception voice signal from the center during conversation, cancels echo and controls howling, and realizes hands-free conversation in emergency informing process.

The operation of the emergency informing terminal in embodiment 1 of the invention having such configuration is explained.

The user presses the emergency informing button 3 at the time of emergency such as traffic accident or sickness.

When pressed by the user, the emergency informing button 3 sends a push operation signal to the control unit 12.

The control unit 12, when receiving the operation signal from the emergency informing button 3, recognizes an emergency call request, and starts emergency informing process.

Or if the shock sensor 22 detects a shock larger than a specified value due to the accident, the air bag equipment 5 develops the air bag, and issues an air bag developing signal to the emergency informing terminal 1 by a direct line 19.

The control unit 12 receives the air bag developing signal from the air bag equipment 5 through LAN signal line 20, or a fuel cut-off signal from the shock sensor 22 through a fuel cut-off signal line 21, and starts the emergency informing process.

The control unit 12 acquires position information and other data, and the center telephone number stored in the memory unit 15, and requests a telephone call to the emergency informing unit 11 by using this telephone number.

The emergency informing unit 11 starts telephone call to the partner corresponding to the telephone number through the base station of communications operator by using the communication antenna 2.

The emergency informing unit 11 sends a signal telling transfer to conversation to the control unit 12. The control unit 12 judges conversation is successful, and transmits the position information and other data to the center through the base station of communications operator.

Further, the emergency informing terminal 1 has a function of recognizing signal inputs of plural formats, when receiving a signal for automatic emergency call, judging whether an input signal from a vehicle having vehicular electric equipment connected in network by vehicular LAN bus line 23, or an input signal from a vehicle using a direct line other than LAN signal line.

For example, the air bag equipment 5 issues a status signal for identifying the vehicle for an automatic emergency call.

That is, by this status signal, the control unit 12 identifies the signal format, whether the input signal is a signal from the air bag equipment 5 connected to the LAN, or a signal from the air bag equipment 5 directly connected by a direct line. The control unit 12 transfers to the signal processing state of the signal format identified by the status signal, and processes the signal.

If the input signal from the vehicle mounting the air bag equipment has been preliminarily known whether the signal via LAN or signal via a direct line, the signal format may be identified by input of the status (H/L) based on the signal.

As mentioned above, the device for issuing the status signal may be also other than the air bag equipment 5.

Further, the control unit 12, while receiving a regular signal issued during regular state of the air bag equipment 5, informs the user that the operation is regular by means of an indicator or the like. If an irregular signal is entered, or disconnection or other abnormality is detected, the control unit 12 judges abnormal, and informs the user of abnormality of input signal. Further, the control unit 12 starts an emergency informing process when receiving a signal for automatic emergency informing process by air bag developing or fuel cut-off due to an accident.

As mentioned above, the emergency informing terminal of the invention is not limited to specific vehicles only, but is applicable to general vehicles generating automatic emergency call signals issued in different signal formats, and signals for automatic emergency call by air bag developing signal or fuel cut-off signal generated in different signal formats. Thus, a versatile emergency informing terminal applicable to plural vehicles is realized.

This emergency informing terminal executes emergency informing process by air bag developing signal, fuel cut-off signal, or LAN emergency call request signal. Accordingly, the emergency informing terminal is widely applicable to any type of vehicle, including a vehicle executing emergency informing process by recognizing air bag developing signal as collision detection, a vehicle executing emergency informing process by recognizing fuel cut-off signal as collision detection, and a vehicle executing emergency informing process by detecting an emergency call request signal from LAN.

(Embodiment 2)

Figure 2:
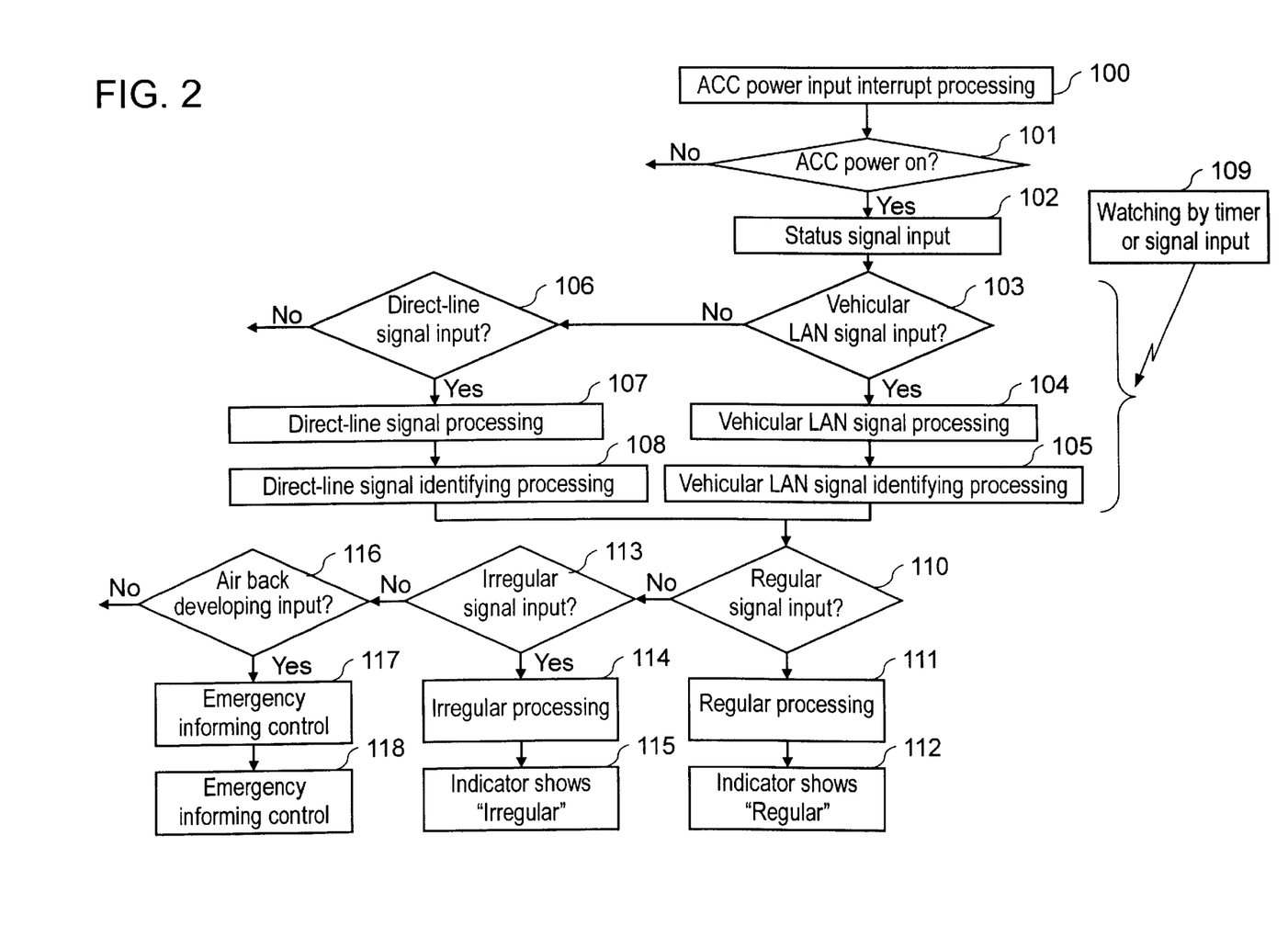
FIG. 2 is a flowchart showing flow of process of control unit for composing an emergency informing terminal in embodiment 2 of the invention.

FIG. 2 is a flowchart showing flow of process of control unit 12 of emergency informing terminal 1 in embodiment 2 of the invention.

FIG. 2 shows a specific flow of function for processing by the emergency informing terminal 1 shown in FIG. 1 by receiving an emergency call signal in the emergency informing unit 11. Herein, the control unit 12 identifies by the signal format of the status signal for identifying the vehicle, whether the emergency informing signal such as an air bag developing signal or a fuel cut-off signal issued by reaction to the operation of the shock sensor 22 is entered from a vehicular LAN or a direct line.

Referring now to the flowchart in FIG. 2, processing of the control unit 12 is explained.

At step 100, by turning on an accessory (ACC) power switch for feeding power to the vehicular electric equipment, ACC power input interrupt processing is executed.

At step 101, when detecting the ON state of vehicular ACC power, going to step 102, a status signal showing the format of signal for emergency informing process is entered, for example, from the air bag equipment 5. By this status signal, the control unit 12 identifies whether the input signal from the vehicle is a signal from a direct line or a signal from LAN, and starts input signal processing.

At step 103, if a vehicle is judged to be a vehicle mounting the LAN, the process goes to step 104 to process input signal from the vehicular LAN.

When receiving a regular signal from a device for issuing an automatic emergency call signal such as an air bag developing signal or a fuel cut-off signal from the vehicular LAN, the state is judged to be regular according to the flow from step 110 to step 112, and the user is informed of a regular state by means of indicator or the like.

If the signal from the device for issuing an automatic emergency call signal is an interrupted, or an irregular signal is entered, the state is judged to be irregular according to the flow from step 113 to step 115, and the user is informed of irregular state by means of indicator or the like.

Further, when receiving a signal instructing automatic emergency informing process such as air bag developing or fuel cut-off state from the device for issuing an automatic emergency call signal, the emergency informing process is executed according to the flow from step 116 to step 118.

At step 109, the control unit 12 always continues recognition process of input signals, by the timer event executed by periodic input signal from a built-in time not shown, or the signal input event executed by input of signal. Thus, the control unit 12 quickly transfers to the process depending on the input signal.

After transferring to step 104 of vehicular LAN signal processing, the process will not go to step 106, and a signal from direct line is not recognized, and the process does not transfer to abnormality processing step in the event of disconnection of the direct line.

When turning on the ACC power, if it is judged to be a vehicle for issuing an emergency informing signal from the direct line by the status signal, the flow is changed to step 106 to step 108, and the input from the direct line is processed. At this time, opposite to the case mentioned above, input of signal from the vehicular LAN is not processed.

If a vehicle is judged to be a vehicle not mounting LAN, control by the emergency informing signal from the LAN and recognition of irregular signal are not executed. Thus abnormality is not recognized if a signal from the LAN is not entered.

In the flowchart in FIG. 2, at step 100, ACC power input interrupt processing is executed, and the control unit 12 starts processing. Instead, interrupt processing may be started by input of ignition power source (IG power).

Thus, the signal such as an air bag developing signal in synchronism with the operating state of the accessory power or ignition power can be identified. Further, by detecting abnormality when a signal from the air bag equipment is not supplied in the event of power failure, so that malfunction can be prevented.

Moreover, by periodically identifying the status signal, by the first identification, malfunction or its state is detected and is prevented from being maintained. By majority decision by checking plural times, the status can be recognized more securely.

As mentioned above, by the status signal received in the control unit 12, the signal of the format corresponding to the vehicle can be received. Therefore, an adequate emergency informing process, and detection of abnormality such as air bag abnormality are realized.

As mentioned above, yet, only the signal format based on status signal can be monitored. By invalidating the monitor of signal not based on the status signal, malfunction due to signal not based on the status signal can be prevented, and by monitoring the signal based on the status signal only, regular operation and irregular operation can be monitored.

In this constitution, the signal format for making an emergency call by the status signal is identified. By monitoring only the signal format based on the status signal, regular operation or irregular operation of the corresponding signal can be identified. By invalidating the monitor of signal not based on the status signal, wrong irregular detection or malfunction due to a signal not based on the status signal can be prevented.

(Embodiment 3)

Figure 3:
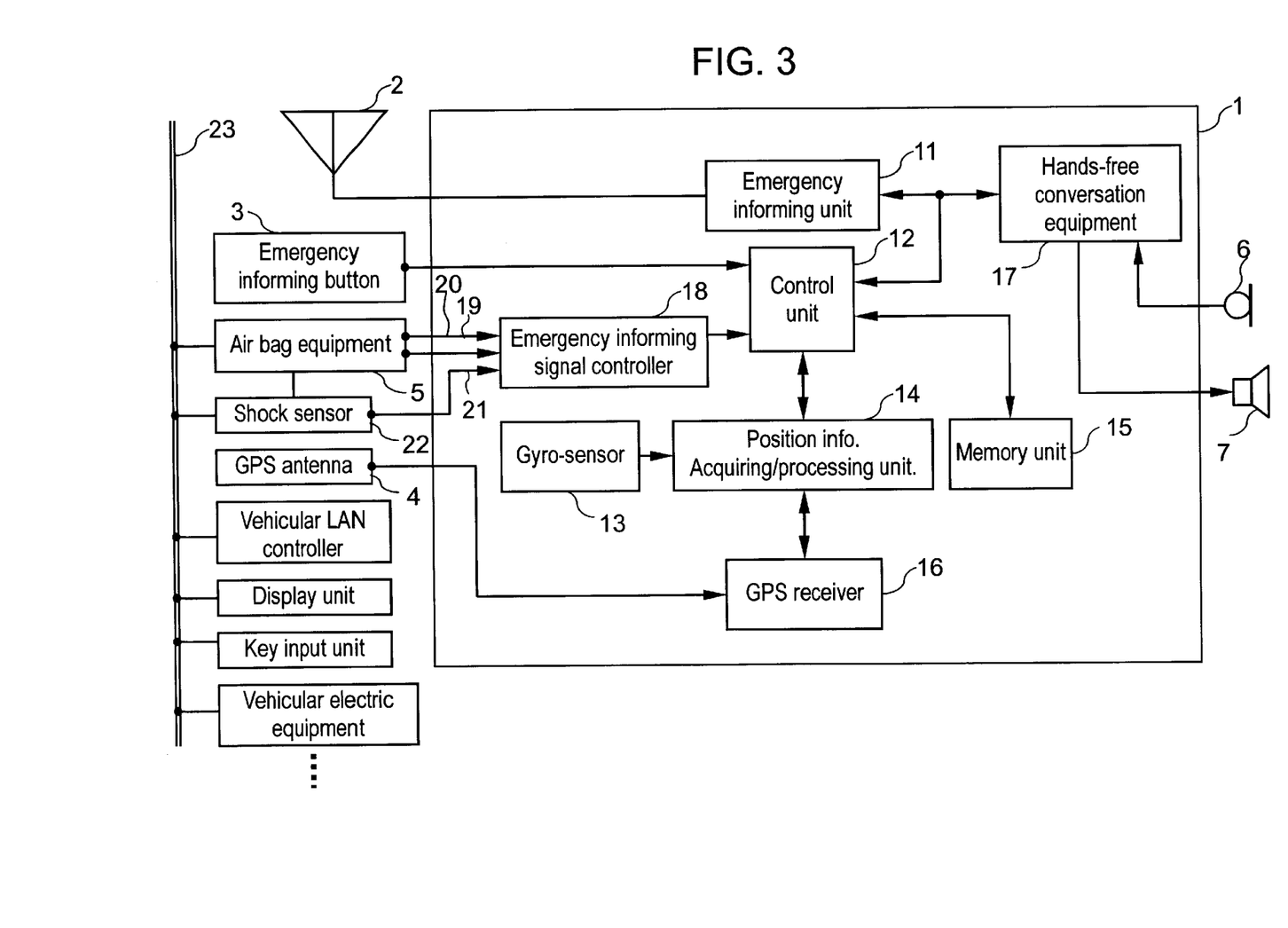
FIG. 3 is a block diagram showing a configuration of an emergency informing terminal in embodiment 3 of the invention.

In embodiment 3 of the invention, for example, an emergency informing signal controller composed of an exclusive microcomputer is installed in addition to the control unit for controlling the emergency informing terminal. This emergency informing signal controller detects a signal for automatic emergency informing process.

FIG. 3 is a block diagram showing a configuration of an emergency informing terminal in embodiment 3 of the invention.

In FIG. 3, the same functional portions as in FIG. 1 are identified with the same reference numerals, and duplicate explanation is omitted.

In FIG. 3, what differs from FIG. 1 is that an emergency informing signal controller 18 includes an exclusive microcomputer is provided in addition to the control unit 12, for the purpose of receiving an automatic emergency call signal issued by signals in different formats, and receiving and processing the status signal for identifying the vehicle.

The emergency informing signal controller 18 receives a signal for automatic emergency informing process, and receives and processes the status signal for identifying the vehicle. Further, the controller 18 detects signals entered in different formats, and issues the information indicated by the signal to the control unit 12.

The emergency informing signal controller 18 recognizes signal input of different formats, such as the signal from the air bag equipment 5 connected to the vehicular LAN, and the signal from the air bag equipment 5 connected directly by a direct line. Further, transferring to the input state of the signal format indicated by the status signal, the input process of the signal is executed. As mentioned above, the status signal may be fixed.

The controller 18 issues a regular signal to the control unit 12 when receiving a regular signal while the air bag equipment 5 is in regular state.

When an irregular signal is entered, or abnormality due to disconnection or the like is detected, the controller 18 sends an irregular signal to the control unit 12.

When receiving a signal for automatic emergency informing process due to air bag developing or fuel cut-off state, the controller 18 sends a signal requesting emergency informing process to the control unit 12.

Depending on the status signal, the controller 18 transfers to the process of a signal a having different format when receiving a signal having different signal format.

When receiving regular signal, irregular signal, or signal showing emergency informing process in a different signal format, the controller 18 converts the format of signal to be sent to the control unit 12 into the same format as above. Hence, the control unit 12 is not required to process differently.

For example, the emergency informing signal controller 18 issues a signal telling irregular state by using a common signal format, on the basis of abnormality when the periodic communication signal from the LAN is not entered, or abnormality when the periodic communication signal from the direct line is not entered. As a result, the control unit 12 can process without consciousness of a direct line or a LAN.

In this way, detection of a signal for the automatic emergency informing process such as an air bag developing signal or a fuel cut-off signal, and detection of an irregular air bag can be processed in an independent device. Therefore, change of processing is not required in the control unit 12.

Further, to cope with an automatic emergency call signal of a new signal format, it is enough to modify the emergency informing signal controller 18 only.

As mentioned herein, the emergency informing terminal of the invention is not limited to specific vehicles only, but is applicable to general vehicles generating automatic emergency call signals issued in different signal formats, and signals for automatic emergency call by an air bag developing signal or fuel cut-off signal generated in different signal formats. Thus, a versatile emergency informing terminal applicable to plural vehicles is realized.

Further, the emergency informing terminal of the invention has a signal identifying unit for identifying preset signal formats aside from plural air bag signals, and can identify which format of air bag signal is entered depending on the vehicle and model. Accordingly, monitoring on the basis of the signal format can be processed. It is also possible to monitor whether the signal of preset format is regular or irregular, so that abnormality can be detected. As a result, failure of communication due to irregular state is avoided.

The emergency informing terminal of the invention includes a first control unit for controlling the emergency informing system, and a second control unit for controlling input of the emergency informing signal into the first control unit. Signals of different formats are converted into one signal format by the second control unit, so that the first control unit can process without consciousness of difference of signal formats. When the signal format is changed in future, only the second control unit can be modified. As a result, various merits are brought about by substantial curtailment in the number of developing steps.

The emergency informing terminal of the invention is not limited to specific vehicles only, but is applicable to general vehicles generating emergency call signals in different signal formats, and an air bag developing signal or a fuel cut-off signal generated in different signal formats.

The emergency call center and emergency informing terminal compose a versatile emergency informing system, not limited to specific vehicles only, but applicable to general vehicles generating emergency call signals in different signal formats, and air bag developing signals or fuel cut-off signals generated in different signal formats.

The control method of the emergency informing terminal of the invention is not limited to specific vehicles only, but is applicable to general vehicles generating emergency call signals in different signal formats, and air bag developing signals or fuel cut-off signals generated in different signal formats.

In this method, input process is also executed in the emergency information signals issued in different signal formats. Also in this method, when a status signal for identifying a vehicle is entered, only the signal from the vehicle indicated by the status signal can be detected. This method realizes control of emergency informing terminal capable of judging whether the input is from the LAN or direct line by the status signal, and acquiring an emergency informing signal of air bag developing signal or fuel cut-off signal from an appropriate format signal.

What is claimed is:

1. An emergency informing terminal mounted on a vehicle for sending an emergency call to a center for supervising an emergency informing system comprising:

means for recognizing and controlling an emergency informing signal entered in a different signal format in every vehicle, and emergency informing means for making an emergency informing process based on the emergency informing signal, wherein the emergency informing process is executed at least based on one of an emergency call request signal from a device connected to a LAN for composing a network in the vehicle through the LAN, and an emergence call request signal from a device mounted on the vehicle through an exclusive line.

2. The emergency informing terminal of claim 1, wherein said means for recognizing and controlling the emergency informing signal receives a status signal for identifying the vehicle, and identifies a signal format of the emergency informing signal entered in the emergency informing terminal at least based on the status signal.

3. The emergency informing terminal of claim 2, wherein said means for recognizing and controlling the emergency informing signal, when selecting one signal form t on the basis of the status signal, invalidates an emergency informing signal entered in another signal format.

4. The emergency informing terminal of claim 1, wherein said means for recognizing and controlling the emergency informing signal receives a status signal for identifying the vehicle, and identifies a signal format of the emergency informing signal entered in the emergency informing terminal, and an irregular signal telling abnormality of a device for issuing the emergency informing signal, at least on the basis of the status signal.

5. The emergency informing terminal of claim 4, wherein said means for recognizing and controlling the emergency informing signal, when selecting an emergency informing signal and an irregular signal entered in one signal format on the basis of the status signal, invalidates an emergency informing signal and an irregular signal entered in another signal format.

6. The emergency informing terminal of claim 1, further comprising:

an emergency informing signal controller for controlling input or output of the emergency informing signal, aside from a control unit for controlling the emergency informing terminal.

7. The emergency informing terminal of claim 6, wherein said emergency informing signal controller includes a circuit having an exclusive microcomputer.

8. The emergency informing terminal of claim 6, wherein said emergency informing signal controller generates an emergency informing signal or an irregular signal to be issued to the control unit for controlling the emergency informing terminal.

9. The emergency informing terminal of claim 8, wherein the irregular signal to be issued to the control unit is generated at least based on of an abnormality of no input of signal from a LAN and abnormality of no input of periodic communication signal from a direct line, in a common signal format, regardless of the LAN or the direct line, so that the control unit processes without consciousness of the direct line or the LAN.

10. The emergency informing terminal of claim 1, wherein the emergency informing signal is one of an air bag developing signal and a fuel cut-off signal issued responding to a shock sensor.

11. An emergency informing terminal mounted on a vehicle for sending an emergency call to a center for supervising an emergency informing system comprising:

means for recognizing and controlling an emergency informing signal entered in a different signal format in every vehicle, and emergency informing means for making an emergency informing process based on of the emergency informing signal, wherein said means for recognizing and controlling the emergency informing signal receives a status signal for identifying the vehicle, and identifies a signal format of the emergency informing signal entered in the emergency informing terminal at least based on of the status signal, and wherein said means for recognizing and controlling the emergency informing signal recognizes whether the vehicle is a vehicle having a LAN for connecting an electric equipment or a vehicle not having the LAN, based on the status signal.

12. The emergency informing terminal of claim 11, wherein said means for recognizing and controlling the emergency informing signal, when recognizing the vehicle to be a vehicle having a LAN on the basis of the status signal, controls to recognize an emergency informing signal from the LAN, and controls not to recognize an emergency informing signal from a direct line other than the LAN.

13. The emergency informing terminal of claim 11, wherein said means for recognizing and controlling the emergency informing signal, when recognizing the vehicle to be a vehicle not having a LAN on the basis of the status signal, controls to recognize a emergency informing signal from a direct line, and controls not to recognize an emergency informing signal from the LAN.

14. An emergency informing terminal mounted on a vehicle for sending an emergency call to a center for supervising an emergency informing system comprising:

means for recognizing and controlling an emergency informing signal entered in a different signal format in every vehicle, and emergency informing means for making an emergency informing process based on of the emergency informing signal, wherein said means for recognizing and controlling the emergency informing signal receives a status signal for identifying the vehicle, and identifies a signal format of the emergency informing signal entered in the emergency informing terminal, and an irregular signal telling abnormality of a device for issuing the emergency informing signal, at least on the basis of the status signal, wherein said means for recognizing and controlling the emergency informing signal, when selecting an emergency informing signal and an irregular signal entered in one signal format on the basis of the status signal, and wherein said means for recognizing and controlling the emergency informing signal recognizes whether the vehicle is a vehicle having a LAN for connecting an electric equipment or a vehicle not having the LAN, on the basis of the status signal.

15. The emergency informing terminal of claim 14, wherein said means for recognizing and controlling the emergency informing signal, when recognizing the vehicle to be a vehicle having a LAN on the basis of the status signal, controls to recognize an emergency informing signal and an irregular signal from the LAN, and controls not to recognize an emergency informing signal and an irregular signal from a direct line other than the LAN.

16. The emergency informing terminal of claim 15, wherein said means for recognizing and controlling the emergency informing signal, by controlling not to recognize an emergency informing signal and irregular signal from a direct line other than LAN, controls not to recognize an abnormality if a signal from the direct line is not entered.

17. The emergency informing terminal of claim 14, wherein said means for recognizing and controlling the emergency informing signal, when recognizing the vehicle to be a vehicle not having a LAN on the basis of the status signal, controls to recognize a emergency informing signal and an irregular signal from a direct line, and controls not to recognize an emergency informing signal and an irregular signal from the LAN.

18. The emergency informing terminal of claim 17, wherein said means for recognizing and controlling the emergency informing signal, by controlling not to recognize emergency informing signal and an irregular signal from the LAN, controls not to recognize an abnormality if a signal from the LAN is not entered.

19. An emergency informing terminal mounted on a vehicle for sending an emergency call to a center for supervising an emergency informing system comprising:

means for recognizing and controlling an emergency informing signal entered in a different signal format in every vehicle;

emergency informing means for making an emergency informing process based on of the emergency informing signal: and an emergency informing signal controller for controlling input or output of the emergency informing signal, aside from a control unit for controlling the emergency informing terminal, wherein said emergency informing signal controller generates an emergency informing signal or an irregular signal to be issued to the control unit for controlling the emergency informing terminal, and wherein a signal for instructing an emergency informing process to be issued to the control unit is generated at least based on one of an emergency informing signal from a LAN and an emergency informing signal from a direct line, in a common signal format, regardless of the LAN or the direct line, so that the control unit processes without consciousness of the direct line or the LAN.

20. An emergency informing terminal mounted on a vehicle for sending an emergency call to a center for supervising an emergency informing system comprising:

means for recognizing and controlling an emergency informing signal entered in a different signal format in every vehicle, and emergency informing means for making an emergency informing process based on the emergency informing signal, wherein said means for recognizing and controlling the emergency informing signal receives a status signal for identifying the vehicle, and identifies a signal format of the emergency informing signal entered in the emergency informing terminal at least base on the status signal, wherein said means for recognizing and controlling the emergency informing signal, when selecting one signal format on the basis of the status signal, invalidates an emergency informing signal entered in another signal format and wherein a status signal or identifying the vehicle is recognized at a time of input of one of a vehicle accessory power source (ACC power) and an ignition power source (IG power), and when one signal format is selected in synchronism with input of one of the ACC power and the IG power, another signal format is invalidated.

21. An emergency informing terminal mounted on a vehicle for sending an emergency call to a center for supervising an emergency informing system comprising:

means for recognizing and controlling an emergency informing signal entered in a different signal format in every vehicle, and emergency informing means for making an emergency informing process based on the emergency informing signal, wherein said means for recognizing and controlling the emergency informing signal receives a status signal for identifying the vehicle, and identifies a signal format of the emergency informing signal entered in the emergency informing terminal at least base on the status signal, wherein said means for recognizing and controlling the emergency informing signal, when selecting one signal format on the basis of the status signal, invalidates an emergency informing signal entered in another signal format and wherein the status signal for identifying the vehicle is periodically entered in the means for recognizing and controlling the emergency informing signal, and when one signal format is selected in synchronism with a recognition process of the status signal, another signal format is invalidated.

22. A control method of an emergency informing terminal mounted on a vehicle for sending an emergency call to a center for supervising an emergency informing system, said method comprising the steps of:

a) judging if the vehicle has a LAN or not by a status signal for identifying the vehicle, b) judging an air bag equipment is regular at a time of input of periodic communication signal from the LAN when the vehicle is recognized to have the LAN at step a), c) judging a start of an emergency informing process upon input of an air bag developing signal from the LAN, d) judging a status to be irregular when a signal from the LAN is not entered, e) ignoring input of a fuel cut-off signal or the air bag developing signal from a direct line, and f) judging the status other than an irregular state by input of an irregular signal from the direct line or non-input of regular signal.

23. A control method of an emergency informing terminal mounted on a vehicle for sending an emergency call to a center for supervising an emergency informing system, said method comprising the steps of:

a) judging if the vehicle has a LAN or not by a status signal for identifying the vehicle, b) judging an air bag equipment is regular at a time of input of a regular signal form a direct line when the vehicle is recognized not to have a LAN at step a), c) judging a start of a emergency informing process upon input of a fuel cut-off signal or an air bag developing signal from the direct line, d) judging a status to b irregular when the regular signal from the direct line is not entered, e) ignoring input of the air bag developing signal from the LAN, and f) judging the status other than irregular state by non-input of a periodic communication signal from the N or input of an irregular signal.

* * * * *

UNITED STATES PATENT AND TRADEMARK OFFICE
CERTIFICATE OF CORRECTION

PATENT NO.     : 6,617,979 B2
DATED          : September 9, 2003
INVENTOR(S)    : Yoshioka It is certified that error appears in the above-identified patent and that said Letters Patent is hereby corrected as shown below:

Title page,
Item [*] Notice, "Subject to any disclaimer, the term of this patent is extended or adjusted under 35 U.S.C. 154(b) by 0 days" should read -- Subject to any disclaimer, the term of this patent is extended or adjusted under 35 U.S.C. 154(b) by 83 days --.

Column 9,
Line 43, "form t" should read -- format --.

Column 11,
Line 40, "a emergency" should read -- an emergency --.

Column 14,
Line 11, "to b" should read -- to be --.
Line 17, "the N" should read -- the LAN --.

Signed and Sealed this

Twenty-third Day of March, 2004

JON W. DUDAS
*Acting Director of the United States Patent and Trademark Office*